United States Patent
Sugano et al.

(10) Patent No.: US 6,756,463 B2
(45) Date of Patent: Jun. 29, 2004

(54) PROPYLENE POLYMER

(75) Inventors: Toshihiko Sugano, Mie (JP); Masaaki Ito, Mie (JP); Kiyoshi Yukawa, Mie (JP)

(73) Assignee: Japan Polychem Corporation, Tokyo (JP)

( * ) Notice: Subject to any disclaimer, the term of this patent is extended or adjusted under 35 U.S.C. 154(b) by 236 days.

(21) Appl. No.: 10/145,737

(22) Filed: May 16, 2002

(65) Prior Publication Data

US 2003/0216527 A1 Nov. 20, 2003

(51) Int. Cl.$^7$ .................... C08F 110/06; C08F 210/06
(52) U.S. Cl. .................... 526/351; 526/348; 526/160
(58) Field of Search ................. 526/348, 351, 526/160

(56) References Cited

U.S. PATENT DOCUMENTS 6,469,100 B2    10/2002    Suzuki et al.

FOREIGN PATENT DOCUMENTS

| EP | 0 657 477 | 4/1995 |
|---|---|---|
| EP | 0 821 012 | 1/1998 |
| EP | 821012 A2 * | 1/1998 |
| EP | 0 854 155 | 7/1998 |
| EP | 0 963 996 | 12/1999 |
| EP | 1 002 814 | 5/2000 |
| EP | 1 160 261 | 12/2001 |
| EP | 1160263 A1 * | 12/2001 |
| EP | 1 160 263 | 12/2001 |
| JP | A 2000-95791 | 4/2000 |
| JP | A 2001-181343 | 7/2001 |
| JP | A 2001-288220 | 10/2001 |
| WO | WO 99/48935 | 9/1999 |

* cited by examiner

*Primary Examiner*—Roberto Rabago
(74) *Attorney, Agent, or Firm*—Oblon, Spivak, McClelland, Maier & Neustadt, P.C.

(57) ABSTRACT

A propylene polymer is characterized by satisfying the following (1) to (5):

(1) a melt flow rate (MFR) measured at 230° C. under a 2.16 kg load of from 0.1 to 1000 g/10 min;
(2) an isotactic triad traction (mm) measured by $^{13}$C-NMR of 99.0 % or above;
(3) a Q value measured by gel permeation chromatography (GPC) of from 2.0 to 6.0;
(4) a relation between melt flow rate (MFR: g/10 min) measured at 230° C. under a 2.16 kg load and a memory effect (ME) measured at 190° C. at an orifice diameter of 1.0 mm satisfying the following formula (I):

$$1.75 \geq (ME) + 0.26 \times \log(MFR) \geq 1.40 \quad (I);$$

and
(5) a relation of the cold xylene solubles at 23° C. (CXS) satisfying the following formula (II)

$$CXS \leq 0.5 \times [C2] + 0.2 \times \log(MFR) + 0.5 \quad (II)$$

wherein [C2] represents the ethylene unit content (% by weight) in the polymer.

12 Claims, No Drawings

PROPYLENE POLYMER

BACKGROUND OF THE INVENTION

1. Field of the Invention

This invention relates to propylene polymers which are excellent in rigidity and heat resistance and have an appropriate melt tension and favorable molding processability and appearance.

2. Description of the Related Art

Because of having the characteristics of being excellent in rigidity, heat resistance, molding properties, transparency and chemical resistance, propylene polymers have attracted public attention and widely used for a number of purposes such as various industrial materials, various containers, daily necessities, films and fibers.

Metallocene catalysts with the use of metallocene transition metal compounds have been widely employed, since these catalysts generally have a high activity and propylene polymers obtained thereby are excellent in stereostructural properties. However, the propylene polymers produced by using metallocene catalysts have a disadvantage of having a small memory effect (ME) due to a narrow molecular weight distribution and thus showing a poor molding processability. ME is a value serving as an indication of the non-Newtonian properties of a resin. In general, a higher ME indicates the wider molecular weight distribution and a tendency toward the more favorable molding properties particularly owing to the effects of high-molecular weight components.

As a method of obtaining a propylene polymer having a large ME, there has been known a method wherein polymerization is performed by using a $TiCl_3$-type catalyst or a specific Ziegler-Natta catalyst carrying magnesium. However, much cold xylene solubles (CXS) occur in this method, which brings about some problems of stickiness and worsening in rigidity and heat resistance. As techniques for improving ME by using metallocene-type catalysts, Japanese Patent Laid-Open No. 255812/1990 and ibid. No. 179776/1994 disclose methods of controlling molecular weight distribution by using two types of complexes (Hf and Zr), while International Patent Publication No. 2001-500176 proposes to broaden molecular weight distribution by using two types of Zr complexes having high stereoregularity. In case where the distribution is about 7 or lower, ME cannot be improved by these methods. Although ME can be improved thereby in a system having a larger molecular weight distribution value, no homogeneous mixture can be obtained, which results in a tendency that the molding appearance is worsened. It is therefore required to solve these problems. Japanese Patent Laid-Open No. 181343/2001 and ibid. No. 294609/2001 propose polymers having Mw/Mn ratios ranging from 6 to 50 and a process for producing the same. Although these polymers have high Mw/Mn ratios, MEs thereof are not so high. This is because these polymers contain less high-molecular weight components having relatively high molecular weight of 1,000,000 or more which are appropriate for improving ME. On the other hand, Japanese Patent Laid-Open No. 288220/2001 proposes single-peak polymers having Mw/Mn values of from 4 to 6. Although high molecular weight contributing to the improvement in ME can be achieved in this polymerization system, hydrogen is fed at once at the early stage and thus the polymerization is carried out in an almost hydrogen-free state as the hydrogen is consumed. As a result, there arises a problem that ME becomes higher in comparison with the Mw/Mn ratio and thus the appearance is worsened. It is therefore required to overcome this problem.

SUMMARY OF THE INVENTION

Considering the problems as discussed above, the present invention provides propylene polymers which are not only excellent in rigidity and heat resistance but also contain an appropriate amount of high-molecular weight components with little eluting components and have excellent molding processability.

According to the present invention, it has been found out that the above-described problems can be solved by providing a propylene polymer which is characterized by being excellent in stereoregularity, containing a small amount of low-molecular weight components and a small amount of CXS and yet having a large ME.

Accordingly, the propylene polymer of the present invention, which may be copolymerized with ethylene of 0 to 7% by weight, is characterized by comprising satisfying the following requirements:

(1) a melt flow rate (MFR) measured at 230° C. under a 2.16 kg load of from 0.1 to 1000 g/10 min;

(2) an isotactic triad fraction (mm) measured by $^{13}$C—NMR of 99.0% or above;

(3) a Q value (i.e., the ratio of weight-average molecular weight (Mw) to number-average molecular weight (Mn)) measured by gel permeation chromatography (GPC) of from 2.0 to 6.0;

(4) a relation between MFR measured at 230° C. under a 2.16 kg load and a memory effect (ME) measured at 190° C. at an orifice diameter of 1.0 mm satisfying the following formula (I):

$$1.75 \geq (ME)+0.26\times \log(MFR) \geq 1.40 \tag{I};$$

and (5) a relation of the cold xylene solubles at 23° C. (CXS, unit: % by weight) satisfying the following formula (II)

$$CXS \leq 0.5\times [C2]+0.2\times \log(MFR)+0.5 \tag{II}$$

wherein [C2] represents the ethylene unit content (% by weight) in the polymer.

The present invention is also characterized in that the propylene polymer has been polymerized by using a metallocene catalyst.

DETAILED DESCRIPTION OF THE INVENTION

The present invention provides novel propylene polymers meeting with the physiological requirements (1) to (5) as described below.

Requirement (1): MFR

The propylene polymer according to the present invention has a melt flow rate (MFR) measured at 230° C. under a 2.16 kg load of from 0.1 to 1000 g/10 min. It is unfavorable from the viewpoint of the molding process that MFR is lower than 0.1, since the fluidity of the polymer is extremely worsened in this case. It is also unfavorable that MFR exceeds 1000, since the impact strength of the polymer is extremely lowered in this case.

It is preferable that the MFR ranges from 0.5 to 500. Favorable uses are restricted depending on the MFR level. In case of using in injection molding, it is favorable that MFR ranges from 10 to 300. In case of using in film-molding or sheet-molding, it is favorable that MFR ranges from 0.5 to 10, still preferably from 1.0 to 10.

To obtain a polymer having a low MFR, it is necessary to lessen the amount of hydrogen serving as a molecular weight controlling agent. In case of using hydrogen in a small amount, however, the ununiformity of active species as will be described hereinbelow can be hardly established, which makes it difficult to satisfy the relationship between ME and MFR according to the present invention.

Requirement (2): Stereoregularity

The propylene polymer according to the present invention has an isotactic triad fraction measured by $^{13}$C—NMR in the propylene unit chain moiety made up of head-to-tail bonds (i.e., the ratio of propylene unit triads, in which propylene units are bonded to each other via head-to-tail bonds and the methyl branches in the propylene units are in the same direction, to arbitrary propylene unit triads in the polymer chain) of 99.0% or above, preferably 99.5% or above. The isotactic triad fraction will be sometimes referred to as mm fraction thereinafter.

This isotactic triad fraction (mm fraction) is a value which indicates that the stereostructure of methyl groups in the polypropylene molecular chain is isotactically regulate. A higher value means that the higher extent of the regulation. In case where this value is less than the lower limit as specified above, there arises a problem of poor heat resistance.

The $^{13}$C—NMR spectrum can be measured by the following method. Namely, the $^{13}$C—NMR spectrum is measured by completely dissolving a sample (350 to 500 mg) in a solvent prepared by adding about 0.5 ml of deuterated benzene which is a lock solvent to about 2.0 ml of o-dichlorobenzene in an NMR sample tube of 10 mm in diameter followed by the measurement by the proton complete decoupling method at 130° C. The measurement conditions are selected so as to give a flip angle of 65° and a pulse interval of $5T_1$ or longer (wherein $T_1$ stands for the maximum value in the methyl group spin-lattice relaxation times) In a propylene polymer, $T_1$ of methylene group and $T_1$ of methine group are shorter than $T_1$ of methyl group. Thus, the recovery ratios of the magnetization of all carbon atoms become 99% or above under these measurement conditions.

The NMR peaks of the propylene polymer of the present invention are identified in accordance with a publicly known method described in Japanese Patent Laid-Open No.273507/1998.

Namely, the methyl group in the third unit of a propylene unit pentad, in which the chemical shift is bonded via a head-to-tail bond and the methyl branches are in the same direction, is referred to as 21.8 ppm and chemical shifts of other carbon peaks are determined on the basis of this standard. According to this standard, the peak assignable to the methyl group in the second unit of the propylene triad represented by PPP [mm] appears within the range of 21.3 to 22.2 ppm, the peak assignable to the methyl group in the second unit of the propylene triad represented by PPP [mr] appears within the range of 20.5 to 21.3 ppm, and the peak assignable to the methyl group in the second unit of the propylene triad represented by PPP [rr] appears within the range of 19.7 to 20.5 ppm.

Requirement (3): Molecular Weight Distribution

Concerning the molecular weight distribution of the propylene polymer according to the present invention, the Q value (i.e., the ratio of weight-average molecular weight (Mw) to number-average molecular weight (Mn)) measured by gel permeation chromatography (GPC) is specified as ranging from 2.0 to 6.0. It is unfavorable from the viewpoint of operation that the Q value is lower than 2.0, since the resin pressure is elevated in the process of molding the polymer in this case. It is also unfavorable that the Q value exceeds 6.0, since the molecular distribution shifts toward the low-molecular weight side too and thus low-molecular weight components are increased, thereby worsening the physical properties such as rigidity in this case. The polymer according to the present invention is characterized by essentially containing little low-molecular weight components and CXS components. It is preferable that the Q value ranges from 2.5 to 5.5, still preferably from 3.0 to 5.0.

Requirement (4): Correlation Between MF and MFR

The propylene polymer according to the present invention is characterized in that the correlation between memory effect (ME), which serves as an indication of the content of high-molecular weight components in the polymer, and MFR, which serves as an indication of the average molecular weight of the polymer, is in a specific relationship represented by the following formula (I). ME is an indication relating to the molding properties and surface appearance of a polymer and generally correlates to the molecular weight and molecular weight distribution. The optimum range of ME varies depending on purpose. In the case of films, sheets and injection molding, an excessively small PE generally results in an increase in the resin pressure during molding and thus there arise some problems such as uneven film thickness or flow irregularities in injection molding. On the other hand, it is also unfavorable that the ME is excessively large, since there arise problems in resin uniformity and thus the transparency is worsened or flow becomes irregular from causes different from the case of an excessively small ME. An excessively large ME brings about additional problems such that the broadened molecular weight causes lowering in rigidity due to an increase in the low-molecular weight components and stickiness. From these viewpoints, the polymer according to the present invention has a correlationship between ME and MFR within a specific range while maintaining the molecular weight distribution as described above.

$$1.75 \geq (ME) + 0.26 \times \log(MFR) \geq 1.40 \qquad (I).$$

It is known by experience that ME primarily correlates to MFR. In general, the effects of the high-molecular weight components are strengthened with an increase in molecular weight (i.e., a decrease in MFR). The polymer according to the present invention is characterized by having a relatively large ME with respect to MFR compared with conventionally known uniform polymers. It is known that an appropriately high ME contributes to the achievement of favorable molding properties. Thus, the propylene polymer according to the present invention is excellent in molding properties. It is still preferable that the relationship represented by the following formula (I-1) is satisfied.

$$1.75 \geq (ME) + 0.26 \times \log(MFR) \geq 1.45 \qquad (I-1).$$

It is further preferable that the relationship represented by the following formula (I-2) is satisfied.

$$1.75 \geq (ME) + 0.26 \times \log(MFR) \geq 1.55 \qquad (I-2).$$

Requirement (5): CXS

In the present invention, the propylene polymer may be a copolymer. The (co)polymer according to the present invention is characterized in that the cold xylene solubles (CXS) at 23° C., which indicates the low-crystallinity components in the polymer, MFR, which indicates of the polymer molecular weight, and the ethylene unit content [C2] (unit: % by weight), which indicates the polymer crystallinity, satisfy the relationship represented by the following formula (II). In the case of a propylene homopolymer, [C2] in the following formula is 0. It is known by experience that CXS primarily correlates to MFR and ethylene content. In general, a polymer having a smaller molecular weight (i.e., a larger MFR) is the more highly soluble in a solvent and thus has a larger CXS value. With an increase in the ethylene content, the crystallinity of the polymer is lowered and thus the polymer becomes more soluble in water, thereby causing a decrease in the CXS value. In the present invention, the content of the ethylene comonomer is from 0 to 7% by weight, preferably from 0 to 5% by weight. It is preferable that the polymer is a homopolymer.

$$CXS \leq 0.5 \times [C2] + 0.2 \times \log(MFR) + 0.5 \quad \text{(II)}$$

wherein [C2] represents the ethylene unit content (% by weight) in the polymer.

The polymer according to the present invention is characterized by having little CXS. Namely, it contains little low-crystallinity components and low-molecular weight components causing a high stickiness of products, worsening rigidity or heat resistance, etc.

It is still preferable that the polymer satisfies the relationship represented by the following formula (II-1).

$$CXS \leq 0.5 \times [C2] + 0.2 \times \log(MFR) + 0.4 \quad \text{(II-1)}$$

It is further preferable that the polymer satisfies the relationship represented by the following formula (II-2).

$$CXS \leq 0.5 \times [C2] + 0.2 \times \log(MFR) + 0.3 \quad \text{(II-1)}$$

(6): Melting Temperature (Tm)

The propylene polymer according to the present invention is preferably characterized by having a melting temperature Tm (° C.) measured by DSC of 120° C. or above. In case where the polymer is to be used giving priority to rigidity and heat resistance, the melting temperature can be elevated by lessening the amount of a comonomer to be used in the polymerization and thus lowering the ethylene content in the polymer. In general, a propylene-ethylene random copolymer containing about 5 to 6% by weight of ethylene has a melting temperature of about 120 to 130° C. It is preferable that the propylene homopolymer according to the present invention has a polymer melting temperature (Tmh) of 149° C. or above, still preferably 155° C. or above and particularly preferably 157° C. or above. In case of random copolymerization with the ethylene where the melting temperature (Tmr) of the random copolymer satisfies Tmr≦120° C. and the relationship Tmr≧149−5.5 [E] wherein [E] represents the content (% by weight) of ethylene in the polymer, still preferable that Tmr≧155−5.5 [E], and particularly preferably that Tmr≧157−5.5 [E].

The propylene polymer according to the present invention may be prepared by an arbitrary process without restriction, so long as a propylene polymer satisfying the above requirements can be obtained thereby. Among all, metallocene catalysts are adequate as a catalyst system to be used in producing the polymer of the present invention and it is preferable to use a specific metallocene catalyst. For example, the propylene polymer can be produced by using the following catalysts.

Component A: at least one metallocene compound selected from the transition metal compounds as will be cited hereinbelow; and component B: at least one compound selected from the group consisting of ion-exchange layered silicates; optionally together with component C: an organic aluminum compound.

(Component A)

The transition metal compounds to be used as the component A constituting polymerization catalysts which are favorable in producing the propylene polymer according to the present invention are transition metal compounds represented by the following general formula (1).

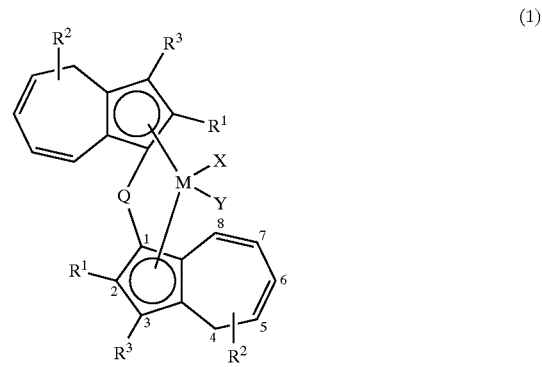

wherein Q represents a linkage group crosslinking two conjugated five-membered cyclic ligands; M represents a metal atom selected from among titanium zirconium and hafnium; X and Y represent each a hydrogen atom, a halogen atom, a hydrocarbyl group, an alkoxyno group, an amino group, a nitrogen-containing hydrocarbyl group, a phosphorus-containing hydrocarbyl group or a silicon-containing hydrocarbyl group bonded to M; $R^1$ and $R^3$ represent each hydrogen, a hydrocarbyl group having 1 to 20 carbon atoms, a halogenated hydrocarbyl group having 1 to 20 carbon atoms, a silicon-containing hydrocarbyl group, a nitrogen-containing hydrocarbyl group, an oxygen-containing hydrocarbyl group, a boron-containing hydrocarbyl group or a phosphorus-containing hydrocarbyl group; and $R^2$s represent each hydrogen, a hydrocarbyl group having 1 to 20 carbon atoms, a halogenated hydrocarbyl group having 1 to 20 carbon atoms, a silicon-containing hydrocarbyl group, a nitrogen-containing hydrocarbyl group, an oxygen-containing hydrocarbyl group, a boron-containing hydrocarbyl group or a phosphorus-containing hydrocarbyl group, preferably an aryl group having 6 to 16 carbon atoms.

Q represents a divalent linkage group crosslinking two conjugated five-membered cyclic ligands and examples thereof include:

(a) a divalent hydrocarbyl group having 1 to 20, preferably 1 to 12 carbon atoms;

(b) a silylene group or an oligosilylene group;

(c) a silylene group or an oligosilylene group having as a substituent a hydrocarbyl group having 1 to 20, preferably 1 to 12 carbon atoms;

(d) a germylene group; or (e) a germylene group having as a substituent a hydrocarbyl group having 1 to 20 carbon atoms.

Among all, an alkylene group and a silylene group having a hydrocarbyl group as a substituent are preferable.

X and Y may be either the same or different and each independently represents the following groups: (a) hydrogen, (b) a halogen, (c) a hydrocarbyl group having 1 to 20, preferably 1 to 12, carbon atoms, or (d) a hydrocarbyl group having 1 to 20, preferably 1 to 12, carbon atoms and containing oxygen, nitrogen or silicon.

Among all, preferable examples thereof include hydrogen, chlorine, methyl, isobutyl, phenyl, dimethylamido and diethylamido groups, etc.

$R^1$ and $R^3$ represent each hydrogen, a hydrocarbyl group having 1 to 20 carbon atoms, a halogenated hydrocarbyl group having 1 to 20 carbon atoms, a silicon-containing hydrocarbyl group, a nitrogen-containing hydrocarbyl group, an oxygen-containing hydrocarbyl group, a boron-containing hydrocarbyl group or a phosphorus-containing hydrocarbyl group. Specific examples thereof include methyl, ethyl, propyl, butyl, hexyl, octyl, phenyl naphthyl, butenyl and butadienyl groups, etc. In addition to the hydrocarbyl groups, citation may be made, as typical examples thereof, of methoxy, ethoxy, phenoxy, trimethylsilyl, diethylamino, diphenylamino, pyrazolyl, indolyl, dimethylphosphino, diphenylphosphino, diphenylboron and diemthoxyboron groups, etc. containing halogen, silicon, nitrogen, oxygen, boron, phosphorus, etc. Among all, hydrocarbyl groups are preferable and methyl, ethyl, propyl and butyl groups are particularly preferable.

$R^2$s represent each hydrogen, a hydrocarbyl group having 1 to 20 carbon atoms, a halogenated hydrocarbyl group having 1 to 20 carbon atoms, a silicon-containing hydrocarbyl group, a nitrogen-containing hydrocarbyl group, an oxygen-containing hydrocarbyl group, a boron-containing hydrocarbyl group or a phosphorus-containing hydrocarbyl group. Among all, aryl groups having 6 to 16 carbon atoms, more specifically, phenyl, $\alpha$-naphthyl, $\beta$-naphthyl, anthracenyl, phenanthryl, pyrenyl, acenaphthyl, aceantrithrenyl groups, etc. are preferable therefor.

These aryl groups may be substituted by a halogen, a hydrocarbyl group having 1 to 20 carbon atoms, a halogenated hydrocarbyl group having 1 to 20 carbon atoms, a nitrogen-containing hydrocarbyl group, an oxygen-containing hydrocarbyl group, a boron-containing hydrocarbyl group or a phosphorus-containing hydrocarbyl group. Among all, phenyl and naphthyl groups are preferable.

M is a metal selected from among titanium, zirconium and hafnium and hafnium is preferable.

Non-limiting examples of the above-described transition metal compounds are as follows:

1. ethylenebis(2-methyl-4-phenyl-4H-azulenyl)hafnium dichloride,
2. ethylenebis(2-ethyl-4-naphthyl-4H-azulenyl)hafnium dichloride,
3. ethylenebis(2-ethyl-4-(4-chloro-2-naphthyl-4H-azulenyl))hafnium dichloride,
4. ethylenebis,(2-ethyl-4-(2-fluoro-4-biphenyl)-4H-azulenyl)hafnium dichloride,
5. isopropylidenebis(2-ethyl-4-phenyl-4H-azulenyl)hafnium dichloride,
6. dimethylsilylenebis(2-ethyl-4-(4-chloro-2-naphthyl-4H-azulenyl))hafnium dichloride,
7. dimethylsilylenebis(2-ethyl-4-biphenyl-4H-azulenyl)hafnium dichloride,
8. dimethylsilylenebis(2-ethyl-4-(2-fluoro-4-biphenyl-4H-azulenyl)hafnium dichloride,
9. diphenylsilylenebis(2-methyl-4-naphthyl-4H-azulenyl)hafnium dichloride,
10. dimethylgermylenebis(2-ethyl-4-(2-fluoro-4-biphenyl-4H-azulenyl)hafnium dichloride and
11. dimethylsilylenebis(2-ethyl-4-(3-chloro-4-t-butyl-4H-azulenyl))hafnium dichloride.

Among all, particularly preferable compounds include dimethylsilylenebis(2-ethyl-4-(2-fluoro-4-biphenyl)-4H-azulenyl)hafnium dichloride, dimethylsilylenebis(2-ethyl-4-(4-chloro-2-naphthyl-4H-azulenyl)hafnium dichloride and dimethylsilylenebis(2-ethyl-4-(3-chloro-4-t-butyl-4H-azulenyl))hafnium dichloride.

The polymer according to the present invention which is excellent in molding properties and contains less xylene solubles is not a technique common to all metallocenes. For example, it is required to have such a special structure as being capable of forming heterologous active sites differing in hydrogen-dependency in a state of being carried on a clay mineral. Complexes having the azulene skeleton are liable to exert such characteristics. Even in azulene-type compounds, these characteristics can be hardly exhibited in case where the seven-membered ring is hydrogenated. However, these characteristics closely relate to the state of carriers and the method of carrying as will be described hereinafter. It is therefore not essentially required in the present invention to specify the structure of the complex. Accordingly, the above description merely indicates an example of the formation of the polymer according to the present invention.

(Component B)

At least one compound selected from the group consisting of ion-exchange layered silicates to be used as the component B in the present invention is a silicate compound having a crystalline structure in which planes formed by ionic bonds, etc. are piled up in parallel at weak bonding strength and the ion contained therein is exchangeable. Most of ion-exchange layered silicates are produced as the main components of clay minerals in nature. However, these ion-exchange layered silicates are not restricted to natural ones but artificial ones are also usable.

Specific examples of the ion-exchange layered silicate include publicly known layered silicates described in "Nendo Kobutugaku", Haruo Shiramizu, Asakura-shoten (1995), etc. It is preferable to use smectites, vermiculites and micas such as montmorillonite, sauconite, beidellite, nontronite, saponite, hectorite, stevensite, bentonite or teaniolite.

Although the component B may be used as such without resort to any special treatment, it is preferable to chemically treat the component B. As the chemical treatment, use may be made of either a surface treatment for eliminating impurities adhering to the surface or a treatment affecting the crystalline structure of the clay. More specifically, examples of the treatment include acid-treatments, alkali-treatment, salt-treatment and organic matter-treatments.

In the present invention, it is preferable to exchange at least 40%, preferablyat least 60%, of the exchangeable cation of the group I metal contained in the ion-exchange layered silicate by a cation dissociated from a salt as will be described hereinafter. The salt to be used in the salt-treatment aiming at the ion exchange is a compound consisting of a cation containing at least one atom selected from the group consisting of the atoms of the groups 1 to 14 and at least one anion selected from the group consisting of halogen atoms, inorganic acids and organic acids. More particularly, it is a compound consisting of a cation containing at least one atom selected from the group consisting of the atoms of the groups 2 to 14 and at least one anion selected from the group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, $OH$, $O_2Cl_2$, $OCl_3$, $OOCH$, $OOCCH_2CH_3$, $C_2H_4O_4$ and $C_5H_5O_7$.

Specific examples thereof include LiF, LiCl, LiBr, LiI, LiOH, $Li_2SO_4$, $Li(CH_3COO)$, $LiCO_3$, $Li(C_6H_5O_7)$, $LiCHO_2$, $LiC_2O_4$, $LiClO_4$, $Li_3PO_4$, $CaCl_2$, $CaSO_4$, $CaC_2O_4$, $Ca(NO_3)_2$, $Ca_3(C_6H_5O_7)_2$, $MgCl_2$, $MgBr_2$, $MgSO_4$, $Mg(PO_4)_2$, $Mg(ClO_4)_2$, $MgC_2O_4$, $Mg(NO_3)_2$, $Mg(OOCCH_3)_2$, $MgC_4H_4O_4$, $Ti(OOCCH_3)_2$, $Ti(CO_3)_2$, $Ti(NO_3)_4$, $Ti(SO_4)_2$, $TiF_4$, $TiCl_4$, $Zr(OOCCH_3)_4$, $Zr(CO_3)_2$, $Zr(NO_3)_4$, $Zr(SO_4)_2$, $ZrF_4$, $ZrCl_4$, $ZrOCl_2$, $ZrO(NO_3)_2$, ZrO (ClO$_4$)$_2$, ZrO(SO$_4$), HF(OOCCH$_3$)$_4$, HF(CO$_3$)$_2$, HF(NO$_3$)$_4$, HF(SO$_4$)$_2$, HFOCl$_2$, HFF$_4$, HFCl$_4$, V(CH$_3$COCHCOCH$_3$)$_3$, VOSO$_4$, VOCl$_3$, VCl$_3$, VCl$_4$, VBr$_3$, Cr(CH$_3$COCHCOCH$_3$)$_3$, Cr(OOCCH$_3$)$_2$OH, Cr(NO$_3$)$_3$, Cr(ClO$_4$)$_3$, CrPO$_4$, Cr$_2$(SO$_4$)$_3$, CrO$_2$Cl$_2$, CrF$_3$, CrCl$_3$, CrBr$_3$, CrI$_3$, Mn(OOCCH$_3$)$_2$, Mn(CH$_3$COCHCOCH$_3$)$_2$, MnCO$_3$, Mn(NO$_3$)$_2$, MnO, Mn(ClO$_4$)$_2$, MnF$_2$, MnCl$_2$, Fe(OOCCH$_3$)$_2$, Fe(CH$_3$COCHCOCH$_3$)$_3$, FeCO$_3$, Fe(NO$_3$)$_3$, Fe(ClO$_4$)$_3$, FePO$_4$, FeSO$_4$, Fe$_2$(SO$_4$)$_3$, FeF$_3$, FeCl$_3$, FeC$_6$H$_5$O$_7$, Co(OOCCH$_3$)$_2$, Co(CH$_3$COCHCOCH$_3$)$_3$, CoCO$_3$, Co(NO$_3$)$_2$, CoC$_2$O$_4$, Co(ClO$_4$)$_3$, Co$_3$(PO$_4$)$_2$, CoSO$_4$, CoF$_2$, CoCl$_2$, NiCO$_3$, Ni(NO$_3$)$_2$, NiC$_2$O$_4$, Ni(ClO$_4$)$_2$, NiSO$_4$, NiCl$_2$, NiBr$_2$, Zn(OOCCH$_3$)$_2$, Zn(CH$_3$COCHCOCH$_3$)$_2$, ZnCO$_3$, Zn(NO$_3$)$_2$, Zn(ClO$_4$)$_3$, Zn$_3$(PO$_4$)$_2$, ZnSO$_4$, ZnF$_2$, ZnCl$_2$, AlF$_3$, AlCl$_3$, AlBr$_3$, AlI$_3$, Al$_2$(SO$_4$)$_3$, Al$_2$(C$_2$O$_4$)$_3$, Al(CH$_3$COCHCOCH$_3$)$_3$, Al(NO$_3$)$_3$, AlPO$_4$, GeCl$_4$, GeBr$_4$ and GeI$_4$.

Among all, compounds prepared by the coexistence of Li salts, Sn salts and Zn salts with acid-treatments or successively subjecting these salts thereto are preferred. As described above with respect to the component (A), the process for selecting the polymer according to the present invention varies depending on the complex, carrier and the method of using hydrogen during the polymerization. Therefore, it is not essentially required in the present invention to specify the method of treating the component (B). The ununiformity (formation of heterologous active sites) occurring in carrying the complex is caused by the formation of sites having different acidities on the clay surface. Owing to the balance between the extent of the ununiformity and the degrees of the easiness in carrying the complex at the respective sites, the PP polymer having a special balance, which is never observed in the conventional polymers, can be produced.

By the acid-treatment, impurities on the surface can be eliminated and, moreover, a part or all of cations such as Al, Fe or Mg in the crystalline structure can be eluted.

It is preferable that the acid to be used in the acid-treatment is selected from among hydrochloric acid, sulfuric acid, nitric acid, phosphoric acid, acetic acid and oxalic acid. Two or more salts and acids may be used in the treatment. Although the conditions for the salt- and acid-treatment are not particularly restricted, it is preferable that the treatment is performed at a salt and acid concentration of from 0.1 to 50% by weight and at a temperature from room temperature to the boiling point for 5 minutes to 24 hours so that at least a part of substance(s) constituting at least one compound selected from the group consisting of the ion-exchange layered silicates can be eluted. The salts and acids are usually employed as an aqueous solution.

These ion-exchange layered silicates usually contain adsorption water and interlayer water. It is preferable in the present invention to use such an ion-exchange layered silicate as the component B after removing these absorption water and interlayer water.

Although the heat treatment method for removing the adsorption water and the interlayer water is not particularly restricted, it is necessary to select such conditions as enabling the complete removal of the interlayer water without causing structural destruction. The heating is performed for 0.5 hour or longer, preferably an hour or longer. In this step, it is preferable that the moisture content of the component B after the treatment is 3% by weight or less, still preferably 1% by weight or less, referring the moisture content achieved after dehydrating at a temperature of 200° C. under a pressure of 1 mmHg for 2 hours as to 0% by weight.

As described above, it is still preferable in the present invention to use as the component B an ion-exchange layered silicate having a moisture content of 3% by weight or less which is obtained by treating with salts and/or acids.

It is also preferable to use, as the component B, spherical particles having an average particle diameter of 5 μm or above. A natural substance or a marketed product may be used as such, so long as the particles are spherical. Alternatively, use can be made of particles the shape and diameter of which have been controlled by granulation, classification, fractionation, etc.

Examples of the granulation method to be used herein include stirring granulation and spray granulation. It is also possible to use a marketed product. In the granulation, use may be made of organic matters, inorganic solvents, inorganic salts or various binders.

To prevent fracturing or formation of fine particles in the course of the polymerization, it is desirable that the spherical particles thus obtained has a compressive destruction strength of 0.2 MPa or above, still preferably 0.5 MPa or above. In case where the particles have such a strength, the effect of improving the particle properties can be effectively achieved particularly in performing pre-polymerization.

(Component C)

Examples of the organic aluminum compound to be used as the component C in a preferable polymerization catalyst in the present invention include trialkylaluminums such as trimethylaluminum, triethylaluminum, tripropylaluminum and triisobutylaluminum and halogen- or alkoxy-containing alkylammoniums such as diethylaluminum monochloride and diethylaluminum monomethoxide represented by the following general formula:

$$AlR_aP_{3-a}$$

wherein R presents a hydrocarbyl group having 1 to 20 carbon atoms; P represents hydrogen, halogen or an alkoxy group; and a is a numerical value satisfying the requirement 0<a≦3. It is also possible to use aluminoxanes such as methylaluminoxane. Among all, a trialkylaluminum is particularly preferable.

<Preparation/Use of Catalyst>

The component A, the component B and, if needed, the component C are brought into contact with each other to give a catalyst. The contact may be carried out in the following orders, though the present invention is not restricted thereto. The contact may be performed not only in the step of preparing the catalyst but also in the pre-polymerization of the olefin or in the polymerization of the olefin.

1) The component A is brought into contact with the component B.

2) The component A is brought into contact with the component B and then the component C is added.

3) The component A is brought into contact with the component C and then the component A is added.

4) The component B is brought into contact with the component C and then the component A is added.

Alternatively, the three components may be brought into contact with each other at the same time.

In the contact of these catalyst components or after the contact, a polymer such as polyethylene or polypropylene or an organic oxide such as silica or alumina may coexist or come into contact.

The contact may be carried out in an inert gas or an inert hydrocarbon solvent such as pentane, hexane, heptane, toluene or xylene. The contact temperature is from −20° C. to the boiling point of the solvent, particularly preferably from room temperature to the boiling point of the solvent.

After the preparation, the catalyst thus obtained may be used as such without washing with an inert solvent, in particular, a hydrocarbon such as hexane or heptane. Alternatively, it may be washed with sucha solvent before using.

If necessary, the above-described component C may be newly combined therewith. The amount of the component C employed herein is selected so as to give an atomic ratio of the aluminum in the component C to the transition metal in the componnt A of 1:0 to 10,000.

Prior to the polymerization, use can be made of a catalyst prepared by pre-polymerizing an olefin such as ethylene, propylene, 1-butene, 1-hexene, 1-octene, 4-methyl-1-pentene, 3-methyl-1-butene, vinylcycloalkane or styrene followed by, if needed, washing.

It is preferable to carry out this prepolymerization in an inert solvent under mild conditions. It is desirable that the prepolymerization is performed so that from 0.01 to 1000 g, preferably from 0.1 to 100 g, of the polymer is formed per gram of the solid catalyst.

The polymerization reaction is carried out either in the presence or absence of an inert hydrocarbon such as butane, pentane, hexane, heptane, toluene or cyclohexane or a solvent such a as liquefied α-olefin. The polymerization temperature ranges from −50° C. to 250° C., while the pressure preferably ranges from atmospheric pressure to about 2000 kg·f/cm$^2$, though the present invention is not restricted thereto. The polymerization can be performed either by the batch method, the continuous method or the semi-batch method.

By introducing hydrogen as a molecular weight controlling agent into the polymerization system, the molecular weight and the molecular weight distribution can be controlled to give the desired polymer.

In case of combining a specific metallocene catalyst with montmorillonite as the component B among the catalyst systems described in the present invention, an active sites having low hydrogen response compared with the usual metallocene active site is also formed and, in its turn, high-molecular weight components are formed. Thus, the weight-average molecular weight can be controlled while maintaining the high-molecular weight components existing therein even in the presence of hydrogen serving as a molecular weight controlling agent. Thus, themolecular weight distribution Q value can be regulated within a range appropriate for resin molding processability.

Since the Q value also depends on the polymerization temperature and the polymerization pressure, it can be regulated within a desired range by optimizing these factors.

Changes in the hydrogen concentration in the polymerization system with the passage of time largely affect not only the molecular weight of the polymer product but also the distribution thereof. In case of feeding hydrogen at once, for example, it is required to obtain a desired MFR that the initial conditions of feeding hydrogen are determined by taking the shift in the molecular weight of the polymer product accompanying the hydrogen consumption with the passage of time into consideration. However, this is not favorable since the MFR can be controlled but a low-molecular weight polymer is formed in a large amount and exerts undesirable effects on the properties of the product in this case.

Since a metallocene catalyst particularly vigorously consumes hydrogen, the hydrogen concentration varies widely in case of feeding hydrogen exclusively in the early stage. In this case, a low-molecular weight polymer is formed in the early stage and then an ultrahigh-molecular weight polymer is formed in the later stage under hydrogen-free conditions. In case of using a metallocene catalyst capable of forming an ultrahigh-molecular weight polymer under the hydrogen-free conditions, it is sometimes feared that the ME becomes excessively large and thus worsens the molding properties or the appearance of molded articles. Accordingly, it is important to regulate the hydrogen concentration within a specific range in the course of the polymerization. Therefore, it is preferable in the present invention to use a device by which hydrogen can be continuously fed so as to maintain the hydrogen concentration at a constant level throughout the polymerization.

With respect to hydrogen, it is preferable to continuously feed hydrogen so as to maintain the hydrogen concentration in the gas phase in an autoclave at a constant level throughout the polymerization in case of bulk polymerization by the batch method or gas phase polymerization. The hydrogen concentration may be regulated to an arbitrary level from 1 ppm to 10000 ppm.

Also, it is preferable to employ the same methods in continuous polymerization. The hydrogen concentration may be regulated to an arbitrary level from 1 ppm to 10000 ppm too. By using these methods, a desired polymer having the physical properties according to the present invention can be obtained.

Copolymerization may carried out by adding a small amount of an α-olefin ($C_4$ to $C_6$) other than ethylene, so long as the physical properties of the polymer disclosed in the present invention are not damaged thereby. In this case, the (α-olefin may be added in an amount up to 6.0% by mol based on propylene.

EXAMPLES

In the following catalyst synthesis step and polymerization step, all operations were conducted under a purified nitrogen atmosphere. Use was made of solvents having been dehydrated with Molecular Sieve MS-4A.

In the present invention, the physical properties are respectively defined by using the following measurement methods and apparatus.

A propylene polymer sample was blended with 0.10% by weight of IRGANOX1010 (manufactured by Ciba Speciality Chemicals), 0.10% by weight of IRGAFOS168 (manufactured by Ciba Speciality Chemicals) and 0.05% by weight of calcium stearate at blending ratio (% by weight) and kneaded and granulated in a monoaxial extruder to give a resin composition in the form of pellets. The sample pellets thus obtained were subjected to the following measurements.

(1) MFR (Melt Flow Rate)
Apparatus: Melt indexer manufactured by Takara.
Measurement method: MFR (unit: g/10 min) was measured in accordance with JIS-K7210 (230° C., under 2.16 kg load)

(2) GPC
The weight-average molecular weight Mw and the number-average molecular weight Mn were measured by using Model GPC150C (manufactured by Waters), three AD80M/S columns (manufactured by Showa Denko) and o-dichlorobenzene as a solvent at a measurement temperature of 140° C.

(3) ME (Memory Effect)
Apparatus: Melt Indexer manufactured by Takara.
Measurement method: The sample was extruded at 190° C. form from orifices (diameter: 1.0 mm, length: 8.0 mm) under loading. At an extrusion speed of 0.1 g/min, the polymer extruded from the orifices was quenched in methanol and then the strand diameter was calculated.

(4) CXS

About 1 g of a powdery polypropylene sample was precisely weighed in a round-bottomed flask. Then 200 ml of xylene was added thereto and the sample was completely dissolved under boiling. Next, it was quenched in a water bath at 23° C. The solid matters thus precipitated were filtered. A 50 ml portion of the filtrate was evaporated to dryness in a platinum dish and further dried under reduced pressure followed by weighing. CXS was calculated as the xylene solubles (% by weight) in the powdery propylene sample.

(5) Ethylene Unit Content

The ethylene unit content (unit: % by weight) in the polymer originating in ethylene comonomer was determined by pressing the obtained polymer into a sheet and measuring by the IR method. More specifically, it was calculated from the height of a peak assignable to methylene chain which was observed at around 730 $cm^{-1}$.

(6) Melting Temperature (Tm)

Using a DSC measurement apparatus manufactured by Seiko, a sample (about 5 mg) was weighed, molten at 200° C. for 5 minutes and then crystallized by cooling to 40° C. at a rate of 10° C./min. Next, it was molten by heating to 200° C. at a rate of 10° C./min. Then evaluation was made on the basis of the melting peak temperature and the temperature at the completion of melting.

Example 1

(1) Synthesis of racemic dichloro{1,1'-dimethylsilylenebis [2-ethyl-4-(4-chloro-2-naphthyl)-4H-azulenyl]}hafnium 2-Bromo-4-chloronaphthalene (2.50 g, 10.30 mmol) was dissolved in a solvent mixture of diethyl ether (50 mL) and hexane (7.5 mL). Then a hexane solution of n-butyllithium (6.8 mL, 10.4 mmol, 1.53 N) was dropped thereinto at 19° C. After stirring at 20° C. for 1 hour, 2-ethylazulene (1.47 g, 9.41 mmol) was added to this solution at 5° C. followed by stirring at room temperature for 1 hour. In the course of the stirring, diethyl ether (5.0 mL) was added. After allowing to stand, the supernatant was removed and the precipitate was washed with hexane (20 mL). After adding hexane (25 mL), the mixture was cooled to 0° C. and tetrahydrofuran (25 mL) was added thereto. After adding N-methylimidazole (30 µL) and dimethyldichlorosilane (0.15 mL, 4.20 mmol), the mixture was stirred at 0° C. for 1.5 hours. Subsequently, a saturated aqueous solution of ammonium chloride (50 mL) was added thereto. After separating, the organic phase was dried over magnesium sulfate and the solvent was distilled off under reduced pressure to thereby give dimethylsilylenebis[2-ethyl-4-(4-chloro-2-naphthyl)-1,4-dihydroazulene] (3.11 g) as a crude product.

The reaction product (3.09 g, 4.21 mmol) obtained above was dissolved in diethyl ether (44 mL). After dropping a hexane solution of n-butyllithium (5.5 mL, 8.41 mmol, 1.53 mol/L) at −70° C., the mixture was slowly heated and stirred at room temperature for 2 hours. After distilling off the solvent, toluene (11 mL) and diethylether (99 mL) were added. The mixture was cooled to −70° C. and, after adding hafnium tetrachloride (1.375 g, 4.29 mmol), slowly heated and stirred at room temperature overnight. The slurry solution thus obtained was concentrated to ⅓ and then filtered by using celite. After washing with toluene (15 mL), the filtrate was concentrated. The crude product was washed with diethyl ether (10 mL) 5 times to thereby give racemic dichloro{1,1'-dimethylsilylenebis [2-ethyl-4-(4-chloro-2-naphthyl)-4H-azulenyl]}hafnium (1.20 g, yield 27%).

$^1$H-NMR (300 MHz, $CDCl_3$) δ 1.00 (s, 6H, $SiMe_2$), 1.00 (t, J=7.8 Hz, 6H, 2-$CH_3CH_2$), 2.40–2.59 (m, 2H, 2-$CH_3CHH$), 2.59–2.75 (m, 2H, 2-$CH_3CHH$), 5.22 (d, J=4.2 Hz, 2H, 4-H), 5.83–5.93 (m, 6H), 6.04–6.08 (m, 2H), 6.80 (d, J=12 Hz, 2H), 7.50–7.60 (m, 4H, arom), 7.59 (d, J=1.5 Hz, arom), 7.73 (d, J=0.6 Hz, 2H, arom), 7.81–7.84 (m, 2H, arom), 8.22–8.25 (m, 2H, arom).

[Chemical Treatment of Ion-Exchange Layered Silicate]

A 500 mL round-bottomed flask was provided with a vacuum stirrer. Then 196.5 g of ion-exchanged water and 51.25 g (525 mmol) of sulfuric acid were successively added thereto followed by stirring. Further, 12.45 g (525 mmol) of lithium hydroxide was added and dissolved therein.

Then 51.65 g of commercially available granulated montmorillonite (Benclay SL, manufactured by Mizusawa Kagaku, average particle diameter: 16.2 µm) was added thereto followed by stirring. Subsequently, the resultant mixture was heated to 100° C. over 10 minutes and then maintained at this temperature for 280 minutes. Next, it was cooled to 50° C. over 1 hour. The obtained slurry was filtered under reduced pressure in a device composed of a Nutsche funnel and a suction bottle connected to an aspirator. The filtration cake was collected, converted into a slurry again by adding 1.6 L of purified water and then filtered. These operations were repeated thrice. The filtration was completed within several minutes each time. The final washing liquor (filtrate) had a pH value of 5. The collected cake was dried in a nitrogen atmosphere at 110° C. overnight. Thus, 41.6 g of a chemically treated product was obtained.

As the result of fluorescent X-ray analysis, the constituting elements showed the following molar ratios to the silicon, i.e., the major component: Al/Si=0.223; Mg/Si=0.048; and Fe/Si=0.028.

[Preparation of Catalyst/Prepolymerization]

The following operations were carried out under an inert gas atmosphere by using deoxidized and dehydrated solvents and monomers. The chemically treated granular ion-exchange layered silicate obtained preliminarily was dried under reduced pressure at 200° C. for 4 hours.

10 g of the chemically treated montmorillonite obtained above was introduced into a round-bottomed flask having an internal volume of 1000 mL. After adding 58 ml of heptane and 42 mg (2.5 mmol/g of carrier) of a heptane solution of triethylaluminum (0.6 mmol/mL), the resultant mixture was stirred at room temperature. 1 hour thereafter, it was washed with heptane thrice and the supernatant was finally eliminated.

Next, 120 ml of a contact solution dimethylsilylenebis (2-ethyl-4-(4-chloro-2-naphthyl-4H-azulenyl)hafnium dichloride with triisobutyl aluminum (M=280.2 µmol, Al/Hf=10) was prepared and added at room temperature followed by stirring for 60 minutes. Subsequently, the above solution was fed into the montmorillonite slurry prepared above and stirred for 60 minutes.

Next, the liquid mixture of the montmorillonite slurry and the dimethylsilylenebis (2-ethyl-4-(4-chloro-2-naphthyl-4H-azulenyl)hafnium dichloride prepared above was fed into a stirring autoclave having an internal volume of 1.0 L which had been sufficiently purged with nitrogen. Further, heptane was added to give a total volume of 500 ml and the resultant mixture was maintained at 30° C.

Subsequently, propylene was fed thereinto at a constant speed of 5 g/h at 40° C. for 4 hours and the resultant mixture was then maintained at 50° C. for 2 hours. Thus, a prepolymerized catalyst containing 4.6 g of polypropylene per gram of the catalyst was obtained.

[Polymerization]

The inside of an autoclave having an internal volume of 200 L was sufficiently purged with propylene. Next, 45000 g of sufficiently dehydrated liquefied propylene was introduced thereinto and maintained at 30° C. Then 470 ml of an n-heptane solution of tirisobutylaluminum (50 g/l) was added thereto. Subsequently,2.5NL of hydrogen and 0.5 g of the above-described solid catalyst component were injected under argon pressure and thus polymerization was initiated. The mixture was heated to 75° C. over 40 minutes and then reacted at 75° C. for 3 hours. During this period, hydrogen was fed at a constant speed of 0.25 g/h. Then 100 ml of ethanol was injected to thereby cease the reaction. After purging the remaining gases, 18.4 kg of a polymer was obtained.

The analytical data of this polymer were as follows: isotactic triad fraction: 99.5%; MFR: 11.30 g/10 min; weight-average molecular weight by GPC: 224500; Mw/Mn: 3.27; melting temperature: 158.5° C.; CXS: 0.40% by weight; and ME: 1.36.

Example 2

[Polymerization]

The inside of an autoclave having an internal volume of 200 L was sufficiently purged with propylene. Then 45,000 g of sufficiently dehydrated liquefied propylene was introduced thereinto and maintained at 30° C. Then 470 ml of an n-heptane solution of tirisobutylaluminum (50 g/l) was added thereto. Subsequently, 2.0 NL of hydrogen and 0.5 g of the solid catalyst component synthesized in Example 1 were injected under argon pressure and thus polymerization was initiated. The mixture was heated to 75° C. over 40 minutes and then reacted at 75° C. for 3 hours. During this period, hydrogen was fed at a constant speed of 0.10 g/h. Then 100 ml of ethanol was injected to thereby cease the reaction. After purging the remaining gases, 15.4 kg of a polymer was obtained.

The analytical data of this polymer were as follows: isotactic triad fraction: 99.3%; MFR: 4.64 g/10 min; weight-average molecular weight by GPC: 303300; Mw/Mn: 3.69; melting temperature Tm: 157.5° C.; CXS: 0.45% by weight; and ME: 1.49.

Example 3

[Polymerization]

The inside of an autoclave having an internal volume of 200 L was sufficiently purged with propylene. Then 45,000 g of sufficiently dehydrated liqustied propylene was introduced thereinto and maintained at 30° C. Then 470 ml of an n-heptane solution of tinsobutylaluminum (50 g/l) was added thereto. Subsequently, 20 NL of hydrogen, 0.675 kg of ethylene and 0.5 g of the solid catalyst component synthesized in Example 1 were injected under argon pressure and thus polymerization was initiated. The mixture was heated to 75° C. over 40 minutes and then reacted at 75° C. for 3 hours. During this period, hydrogen was fed at a constant speed of 0.10 g/h. Then 100 ml of ethanol was injected to thereby cease the reaction. After purging the remaining gases, 14.3 kg of a polymer was obtained.

The analytical data of this polymer were as follows: isotactic triad fraction: 99.4%; MFR: 6.07 g/10 min; weight-average molecular weight by GPC: 255500; Mw/Mn: 3.17; melting temperature Tm: 149.2° C.; ethylene content: 1.22% by weight; CXS: 0.50% by weight; and ME: 1.44.

Comparative Example 1

A PP homopolymer (MA3UQ manufactured by Nippon Polychem) prepared by using the Ziegler-Natta catalyst was subjected to the same analysis and measurement of physical properties.

The analytical data of this polymer were as follows: isotactic triad fraction: 97.8%; MFR: 7.80 g/10 min; weight-average molecular weight by GPC: 310000; Q value: 4.5; melting temperature Tm: 164.0° C.; CXS: 1.8% by weight; and ME: 1.33.

Comparative Example 2

(1) Synthesis of [(r)-dimethylsilylenebis(2-methylbenzoindenyl)zirconium dichloride]

Synthesis was made in accordance with a method described in Organometallics, 1994, 13, 964.

(2) Synthesis of Catalyst 2.4 g of MAO ON $SiO_2$ (20.7 mmol-Al) manufactured by WITCO was added to a glass reactor having an internal volume of 0.5 L and provided with stirring blades. After feeding 50 ml of n-heptane, 20.0 ml (0.0637 mmol) of a solution of (r)-dimethylsilylenebis(2-methylphenylindenyl) zirconium dichloride preliminarily diluted with toluene was added followed by the addition of 4.14 ml (3.03 mmol) of an n-heptane solution of triisobutylaluminum (TIBA). After reacting at room temperature for 2 hours, propylene was flowed thereinto and thus prepolymerization was performed.

(3) Polymerization

The inside of an autoclave having an internal volume of 200 L was sufficiently purged with propylene. Then 3 g of triethylaluminum diluted with n-heptane and 45 kg of liquefied propylene were introduced thereinto and the internal temperature was maintained at 30° C. Then 1.1 g (as the weight excluding the prepolymerization polymer) of the solid catalyst component synthesized preliminarily was added and 5.0 NL of hydrogen was further added.

Next, the mixture was heated to 65° C. to thereby initiate polymerization and then maintained at this temperature for 3 hours. Then 100 ml of ethanol was injected to thereby cease the reaction. After purging the remaining gases, the polymer was dried. Thus, 7.0 kg of the polymer was obtained.

The analytical data of this polymer were as follows: MFR: 5.00 g/10 min; isotactic triad fraction: 95.0%; Q value: 2.8, melting temperature Tm: 150.9° C.; and ME: 1.1.

Example 4

[Synthesis of Complex]

(1) Synthesis of racemic dimethylsilylenebis(2-ethyl-4-(2-fluoro-4-biphenyl)-4H-azulenyl)hafnium dichloride:

(a) Synthesis of Racemic/Meso Mixture

2-Fluoro-4-bromobiphenyl (4.63 g, 18.5 mmol) was dissolved in a solvent mixture of diethyl ether (40 mL) and hexane (40 mL). Then a pentane solution of n-butyllithium (22.8 mL, 36.9 mmol, 1.62 N) was dropped thereinto at −78° C. and the resultant mixture was stirred at −5° C. for 2 hours.

To the obtained solution was added 2-methylazulene (2.36 g, 16.6 mmol) followed by stirring at room temperature for 1.5 hours. Then the mixture was cooled to 0° C. and tetrahydrofuran (40 mL) was added thereto. After adding N-methylimidazole (40 μL) and dimethyldichlorosilane (1.0 mL, 8.30 mmol), the mixture was heated to room temperature and stirred at room temperature for 1 hour. Subsequently, diluted hydrochloric acid was added thereto and the mixture was separated. The organic phase was dried over magnesium sulfate and the solvent was distilled off under reduced pressure. Thus, 6.3 g of a crude product of diemthylsilylenebis(2-ethyl-4-(2-fluoro-4-biphenylyl)-1,4-dihydroazulene) was obtained.

Next, the crude product obtained above was dissolved in diethyl ether (23 mL). A hexane solution of n-butyllithium (10.3 mL, 16.6 mmol, 1.56 mol/L) was dropped thereinto at −78° C. and the mixture was slowly heated and stirred at room temperature for 2 hours. After adding toluene (185 mL), the mixture was cooled to −78° C. Then hafnium tetrachloride (2.65 g, 8.3 mmol) was added and the mixture was slowly heated and stirred at room temperature overnight. Most of the solvent was distilled off under reduced pressure from the slurry solution thus obtained and the residue was filtered. Then it was washed with toluene (4 mL), hexane (9 mL), ethanol (20 mL) and hexane (10 mL) to thereby give a racemic/meso mixture of dichloro{1,1'-dimethylsilylenebis[2-ethyl-4-(2-fluoro-4-biphenylyl)-4H-azulenyl]}hafnium (1.22 mg, yield 16%).

(b) Purification of Racemic Compound

The racemic/meso mixture (1.1 g) obtained above was suspended in dichloromethane (30 mL) and irradiated with a high-pressure mercury lamp (100W) for 30 minutes. Then the solution was distilled under reduced pressure. The solid thus obtained was suspended by adding dichloromethane (40 mL) and filtered. After washing with hexane (3 mL) and dried under reduced pressure, the racemic compound (577 mg, 52%) was obtained.

$^1$H—NMR (300 MHz, CDCl$_3$) δ 1.02 (s, 6H, SiMe$_2$), 1.08 (t, J=8 Hz, 6H, 2-CH$_3$CH$_2$), 2.54 (sept, J=8 Hz, 2H, CH$_3$CH$_2$), 2.70 (sept, J=8 Hz, 2H, 2-CH$_3$CH$_2$), 5.07 (br s, 2H, 4-H), 5.85–6.10 (m, 8H), 6.83 (d, J=12 Hz, 2H), 7.30–7.6 (m, 16H, arom).

[Chemical Treatment of Ion-Exchange Layered Silicate]

To a 5 L separable flask was provided with stirring blades and a reflux condenser, 500 g of ion-exchanged water and 249 g (5.93 mol) of lithium hydroxide monoxide were successively added followed by stirring.

Separately, 581 g (5.93 mol) of sulfuric acid was diluted with 500 g of ion-exchanged water and dropped into the above-described lithium hydroxide solution with the use of a dropping funnel. By this treatment, a portion of sulfuric acid was consumed in the neutralization reaction and thus lithium sulfate was formed in the system. Owing to the further sulfuric acid-excess, the solution became acidic.

Then 350 g of commercially available granulated montmorillonite (Benclay SL, manufactured by Mizusawa Kagaku, average particle diameter: 28.0 μm) was added thereto followed by stirring. Subsequently, the resultant mixture was heated to 108° C. over 30 minutes and then maintained at this temperature for 150 minutes. Next, it was cooled to 50° C. over 1 hour. The obtained slurry was filtered under reduced pressure in a device composed of a Nutsche funnel and a suction bottle connected to an aspirator. The filtration cake was collected, converted into a slurry again by adding 5.0 L of purified water and then filtered. These operations were repeated four times. The filtration was completed within several minutes each time. The final washing liquor (filtrate) had a pH value of 5.

The collected cake was dried in a nitrogen atmosphere at 110° C. overnight. Thus, 275 g of a chemically treated product was obtained. As the result of fluorescent X-ray analysis, the constituting elements showed the following molar ratios to the silicon, i.e., the major component: Al/Si=0.21; Mg/Si=0.046; and Fe/Si=0.022.

[Preparation of Catalyst/prepolymerization]

The following operations were carried out under an inert gas atmosphere by using deoxidized and dehydrated solvents and monomers. The chemically treated granular ion-exchange layered silicate obtained preliminarily was dried under reduced pressure at 200° C. for 4 hours.

200 g of the chemically treated montmorillonite obtained above was introduced into an autoclave having an internal volume of 10 L. After adding 1160 ml of heptane and 840 ml (0.5 mol) of a heptane solution of triethylaluminum (0.6 mmol/ml) over 30 minutes, the resultant mixture was stirred at 25° C. for 1 hour. Then the slurry was sedimented by allowing to stand. 1300 ml of the supernatant was withdrawn and washed twice with 2600 ml of heptane. Then heptane was further added to give a final volume of 1200 mL.

To a 2L flask were fed 5.93 g (6 mol) of dimethylsilylenebis(2-ethyl-4-(2-fluoro-4-biphenyl)-4H-azulenyl)hafnium dichloride and 516 ml of heptane. After stirring well, 84 ml (11.8 g) of a heptane solution (140 mg/ml) of tirisobutylaluminum was added thereto at room temperature and the resultant mixture was stirred for 60 minutes.

Subsequently, the above-described solution was added to the montmorillonite slurry prepared above in the autoclave and the mixture was stirred for 60 minutes. Next, heptane was fed thereinto to give a final volume of 5 L and the resultant mixture was then maintained at 30° C. Propylene was introduced thereinto at a constant speed of 100 g/h at 40° C. for 4 hours and then the mixture was maintained at 50° C. for 2 hours. The prepolymerized catalyst was collected with a siphon and, after removing the supernatant, dried under reduced pressure at 40° C. Thus a prepolymerized catalyst containing 2.0 g of polypropylene per gram of the catalyst was obtained.

[Polymerization]

To a liquid phase polymerization tank having an internal volume of 400 L and provided with stirrer, liquefied propylene, hydrogen and TIBA were continuously fed. The liquefied propylene and TIBA were fed respectively at rates of 90 kg/h and 21.2 g/h, while hydrogen was fed to give a molar concentration [H$_2$] of 30 ppm. Further, the solid catalyst component (A) obtained above was fed thereinto so as to give a concentration of the solid component contained in (A) of 1.36 g/h. The polymerization tank was cooled to thereby adjust the polymerization temperature to 65° C. The slurry polymerized in this polymerization tank was withdrawn by using a slurry pump.

The slurry was withdrawn at such a rate as to give the concentration of the polypropylene particles contained in the slurry of about 10.8 kg/h. The average residence time of the polypropylene particles in the liquid phase polymerization tank was 2 hours. The average particle diameter (Dp50) of the polypropylene particles was 436 μm, the average CE thereof was 7900/g, the polymer MFR was 2.3 g/10 min, the CXS was 0.26% by weight, the Q value was 4.5 and the ME was 1.54. The catalytic efficiency (CE) is defined as the yield (g) of polypropylene per gram of the solid component contained in the solid catalyst component (A).

Example 5

The procedure of Example 4 was followed but maintaining the hydrogen concentration [H$_2$] at 200 ppm, feeding 1.63 g of the catalyst and controlling the average residence time to 1.5 h.

The average particle diameter (Dp50) of the obtained polymer was 457, the average CE thereof was 10300/g, the polymer MFR was 63/10 min, the CXS was 0.20% by weight, the Q value was 4.0 and the ME was 1.23.

Comparative Example 3

A follow-up test was carried out on the catalyst system according to Japanese Patent Laid-Open NO. 294609/2001.

Preparation of Carried Catalyst (1) Preparation of Carrier 51.25 g of sulfuric acid and 12.45 g of lithium hydroxide were dissolved in desalted water to give 260.2 g of a solution. Then 51.65 g of a montmorillonite-based clay (Benclay SL, manufactured by Mizusawa Kagaku) was added thereto and the obtained solution was heated to its boiling point followed by refluxing under heating for 280 minutes. Then, the collected montmorillonite was thoroughly washed with desalted water, pre-dried and then dried at 200° C. to thereby give a chemically treated clay mineral.

To 1.14 g of this chemically treated montmorillonite was added 5.1 ml of a toluene solution (0.45 mol/L) of triethylaluminum and the resultant mixture was stirred at room temperature for 1 hour. Next, it was washed with toluene to give 601 g/L of a montmorillonite-toluene slurry.

(2) Preparation of Prepolymerized Catalyst

To 99.6 ml of a toluene solution (2.05 mmol/L) of dichloro{1,1'-dimethylsilylenebis[2-ethyl-4-(4-chloro-5,6,7,8-tetrahydronaphthyl)-4H-5,6,7,8-tetrahydroazulenyl]} hafnium, 2.3 ml of a triisobutylaluminum-toluene solution (0.87 mol/L) was added and the resultant mixture was stirred at 40° C. for 10 minutes. To 17.1 ml (complex content: 34.2 mmol/L) of this solution, 1.9 ml of the montmorillonite-toluene slurry obtained in (1) was added and the resultant mixture was further stirred at room temperature for 40 minutes. 19.0 ml of the catalyst-carrying slurry was thoroughly dried and fed into a 2L autoclave of the induction stirring type which had been purged with nitrogen. After adding 81.0 ml of toluene, 10 ml of propylene was fed into the autoclave and the resultant mixture was stirred at 30° C. for 2 hours and then at 50° C. for additional 2 hours The slurry thus formed was allowed to stand and then the supernatant was withdrawn. Then toluene was further fed to give a prepolymerized catalyst slurry having a montmorillonite concentration adjusted to 11.50 g/L.

[Polymerization]

The inside of an autoclave having an internal volume of 200 L was sufficiently purged with propylene. Next, 45000 g of sufficiently dehydrated liquefied propylene was introduced thereinto and maintained at 30° C. Then 470 ml of an n-heptane solution of tirisobutylaluminum (50 g/l) was added thereto. Subsequently, 5.0 NL of hydrogen and 0.5 g of the above-described solid catalyst component were injected under argon pressure and thus polymerization was initiated. The mixture was heated to 75° C. over 40 minutes and then reacted at 75° C. for 3 hours. During this period, hydrogen was fed at a constant speed of 0.15 g/h. Then 100 ml of ethanol was injected to thereby cease the reaction. After purging the remaining gases, 21.6 kg of a polymer was obtained.

The analytical data of this polymer were as follows: isotactic triad fraction: 99.5%; MFR: 2.0 g/10 min; weight-average molecular weight by GPC: 358000; Mw/Mn: 4.39; melting temperature: 160.0° C.; CXS: 1.30% by weight; and ME: 1.27.

Comparative Example 4

[Polymerization]

Polymerization was carried out by feeding 7.0 NL of hydrogen at the early stage but feeding no more hydrogen thereafter. As a result, 22.5 kg of a polymer having an isotactic triad fraction of 99.5%, an MFR of 3.0 g/10 min, a weight-average molecular weight by GPC of 251000, an Mw/Mn of 7.8 and an ME of 1.30 was obtained.

TABLE 1

| | | Example 1 | Example 2 | Example 3 | Comp. Example 1 | Comp. Example 2 | Example 4 | Example 5 | Comp. Example 3 | Comp. Example 4 |
|---|---|---|---|---|---|---|---|---|---|---|
| MFR | dg/min | 11.30 | 4.64 | 6.07 | 7.80 | 5.00 | 2.3 | 63 | 2.0 | 3.0 |
| mm | Mol % | 99.5 | 99.3 | 99.4 | 97.8 | 95.0 | 99.1 | 99.2 | 99.5 | 99.5 |
| Q value | — | 3.27 | 3.69 | 3.17 | 4.5 | 2.8 | 4.5 | 4 | 4.39 | 7.8 |
| Tm | ° C. | 158.5 | 157.5 | 149.2 (C2 1.22 wt %) | 164.0 | 150.9 | 157.0 | 157.0 | 160.0 | 158.3 |
| ME | — | 1.36 | 1.49 | 1.44 | 1.33 | 1.1 | 1.54 | 1.23 | 1.27 | 1.30 |
| Right side value of formula (I) | — | 1.13 | 1.23 | 1.20 | 1.17 | 1.22 | 1.31 | 0.93 | 1.32 | 1.28 |
| | | ◯ | ◯ | ◯ | ◯ | X | ◯ | ◯ | X | ◯ |
| CXS | wt % | 0.40 | 0.45 | 0.50 | 1.8 | 0.5 | 0.26 | 0.20 | 1.30 | 0.3 |
| Right side value of formula (I) | | 0.71 | 0.63 | 1.27 | 0.68 | 0.64 | 0.57 | 0.86 | 0.56 | 0.98 |
| | | ◯ | ◯ | ◯ | X | ◯ | ◯ | ◯ | ◯ | ◯ |

According to the present invention, it is possible to provide propylene polymers which are not only excellent in rigidity and heat resistance but also have much high-molecular weight components and favorable molding processability.

This application is based on Japanese patent applications JP2001-10221, filed Jan. 8, 2001, and JP2001-303711, filed Oct. 3, 2001, the entire contents of each of which are hereby incorporated by reference, the same as if set forth at length.

What is claimed is:

1. A propylene polymer, which may be copolymerized with ethylene of 0 to 7% by weight, comprising satisfying the following requirements:

(1) a melt flow rate (MFR) measured at 230° C. under a 2.16 kg load of from 0.1 to 1000 g/10 min;

(2) an isotactic triad fraction (mm) measured by $^{13}$C-NMR of 99.0% or above;

(3) a Q value (i.e.,the ratio of weight-average molecular weight (Mw) to number-average molecular weight (Mn)) measured by gel permeation chromatography (GPC) of from 2.0 to 6.0;

(4) a relation between MFR measured at 230° C. under a 2.16 kg load and a memory effect (ME) measured at 190° C. at an orifice diameter of 1.0 mm satisfying the following formula (I):

$$1.75 \geq (ME) + 0.26 \times \log(MFR) \geq 1.40 \quad \text{(I)};$$

and (5) a relation of the cold xylene solubles at 23° C. (CXS, unit: % by weight) satisfying the following formula (II)

$$CXS \leq 0.5 \times [C2] + 0.2 \times \log(MFR) + 0.5 \quad \text{(II)}$$

wherein [C2] represents the ethylene unit content (% by weight) in the polymer.

2. The propylene polymer as claimed in claim 1, wherein the propylene polymer has been polymerized by using a metallocene catalyst.

3. The propylene polymer as claimed in claim 1, wherein the Q value is 2.5 to 5.5.

4. The propylene polymer as claimed in claim 1, wherein the Q value is 3 to 5.

5. The propylene polymer as claimed in claim 1, which has a melting temperature (Tm) measured by DSC of 120° C. or above.

6. The propylene polymer as claimed in claim 1, wherein the relationship represented by the following formula (I-2) is satisfied:

$$1.75 \geq ME + 0.26 \times \log(MFR) \geq 1.55 \qquad (I\text{-}2).$$

7. The propylene polymer as claimed in claim 1, wherein the relationship represented by the following formula (II-1) is satisfied:

$$CXS \leq 0.5 \times [C2] + 0.2 \times \log(MFR) + 0.4 \qquad (II\text{-}1).$$

8. The propylene polymer as claimed in claim 1, wherein the relationship represented by the following formula (II-2) is satisfied:

$$CXS \leq 0.5 \times [C2] + 0.2 \times \log(MFR) + 0.3 \qquad (II\text{-}2).$$

9. The propylene polymer as claimed in claim 1, which is a homopolymer having a polymer melting temperature (Tmh) of 149° C. or above 10. The propylene polymer as claimed in claim 1, which is a homopolymer having a polymer melting temperature (Tmh) of 157° C. or above.

11. The propylene polymer as claimed in claim 1, which is a random copolymer i) having a melting temperature (Tmr) of 120° C. or above and ii) satisfying the relationship: Tmr≥149−5.5 [E], wherein [E] represents the content (% by weight) of ethylene in the polymer.

12. The propylene polymer as claimed in claim 11, wherein Tmr≥155−5.5 [E].

* * * * *